3,817,741
CONTROL OF WEEDS WITH 2-ALKYLTHIO-
4,6-DIAMINO-s-TRIAZINES
Manfred Kuhne, Pfeffingen, Basel-Land, and Christian
 Vogel, Binningen, Basel-Land, Switzerland, assignors
 to Ciba-Geigy Corporation, Ardsley, N.Y.
No Drawing. Original application Aug. 16, 1971, Ser.
 No. 172,263, now Patent No. 3,746,710. Divided and
 this application June 25, 1973, Ser. No. 373,590
Int. Cl. A01n 9/22
U.S. Cl. 71—93                8 Claims

ABSTRACT OF THE DISCLOSURE

New 2-alkylthio-4,6-alkylamino-s-trazines of the formula

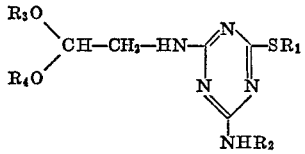

(I)

wherein $R_1$ represents the methyl or ethyl radical, $R_2$ represents an optionally cyano-substituted alkyl radical having 1 to 4 carbon atoms, or a cycloalkyl radical having 3 to 5 carbon atoms, $R_3$ and $R_4$ each represent, independently of each other, a lower alkyl radical, or together represent the ethylene group with the formation of a dioxolane ring, are described with processes for their production. These new compounds are used for the control of mono- and dicotyledonous weeds.

---

This is a division of application Ser. No. 172,263, filed on Aug. 16, 1971, now Pat. No. 3,746,710.

The present invention relates to new 2-alkylthio-4,6-diamino-s-triazines, to processes for the production thereof, also to herbicidal agents containing these new compounds as active substances, and to processes for the control of mono- and dicotyledonous weeds using the new active substances or the agents containing them.

The new 2-alkylthio-4,6-diamino-s-triazines correspond to formula I:

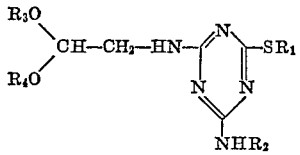

(I)

The symbols in this formula have the following meanings:

$R_1$ represents the methyl or ethyl radical, $R_2$ represents an optionally cyano-substituted alkyl radical having 1 to 4 carbon atoms or a cycloalkyl radical having 3 to 5 carbon atoms, $R_3$ and $R_4$ each represent, independently of each other, a lower alkyl radical, or together they represent the ethylene group with the formation of a dioxolane ring.

In this formula, $R_2$, $R_3$ and $R_4$ represent the methyl, ethyl, n-propyl, or isopropyl radical, or one of the four isomeric butyl radicals; in the case of $R_2$, such lower alkyl radicals can be substituted by cyano. $R_2$ can also represent the cyclopropyl, cyclobutyl or cyclopentyl radical.

The new 2-alkylthio-4,6-diamino-s-triazines are obtained according to the present invention by reacting (a) cyanuric chloride, in any chosen sequence, with an aminoacetal of formula II:

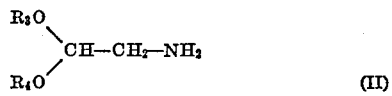

(II)

an amine of formula III:

$$R_2\text{—}NH_2 \qquad (III)$$

and a mercaptan of formula IV $$R_1\text{—}SH \qquad (IV)$$

or with an alkali metal salt of such a mercaptan;

(b) a 2-alkylthio-4,6-dichloro-s-triazine of formula V:

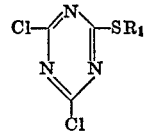

(V)

with an aminoacetal of formula II and an amine of formula III; or (c) a 4-alkylamino-2,6-dichloro-s-triazine of formula VI:

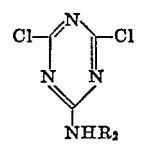

(VI)

with an aminoacetal of formula II, and subsequently with a mercaptan of formula IV, or with the alkali metal salt of such a mercaptan.

The reactions (a), (b) and (c) are performed in the presence of a solvent or diluent, and in the presence of an acid-binding agent. If, however, instead of a mercaptan of formula IV, an alkali metal salt of such a mercaptan is used, then an acid-binding agent is not necessary. In the formulae II to VI, the symbols $R_1$ to $R_4$ have the meanings given under formula I.

Suitable solvents and diluents for the reactions according to the invention are water, aliphatic and aromatic hydrocarbons and halogenated hydrocarbons, ketones such as acetone and methyl ethyl ketone, ethers and ethereal compounds, nitriles, N,N-dialkylated amides, sulphoxides, etc., as well as mixtures of such solvents with each other and with water.

Most suitable as acid-binding agents for the process according to the invention are inorganic bases, such as alkali metal and alkaline-earth metal hydroxides and carbonates. Also applicable are tertiary amines such as trialkylamines, pyridine and pyridine bases. For the introduction of an amino group are preferred, as acid-binding agents, the alkali metal hydroxides such as sodium hydroxide and potassium hydroxide. As acid-binding agent it is likewise possible, however, to use the respective amino components (formulae II and III) in excess. Applicable for the introduction of a mercapto group by means of a mercaptan of formula IV are both trialkylamines and alkali metal hydroxides; if an alkali metal salt of a mercaptan of formula IV is used, then the addition of a base is not necessary. The reaction temperatures are in the range of −20° to 120°. The exchange of the 1st chlorine atom in the cyanuric chloride molecule occurs in the range of −20° to 10°, that of the 2nd chlorine atom in the range of 0° to 50°, and that of the 3rd chlorine atom in the range of 30° to 120°.

The exchange of the chlorine atom by the methylthio or ethylthio radical is effected by adding to a suspension of the corresponding 2-chlorotriazine in a diluent, e.g. acetone/water, an aqueous trimethylamine solution, and stirring until a clear solution is obtained; the double molar amount of gaseous methyl mercaptan or ethyl mercaptan is thereupon introduced, the solution stirred at room temperature, and the formed oil then processed. The substitution of the chlorine atom can also be effected by adding the corresponding 2-chloro-s-triazine to an alcoholic or alcoholic-aqueous solution of an alkali metal mercaptide, and refluxing the thus obtained mixture until a neutral reaction is indicated.

The following examples illustrate the production of the new 2-alkylthio - 4,6 - diamino-s-triazines of formula I. Further triazines produced by the processes described in the examples are given in the attached table. The temperatures are stated in degrees Centigrade.

EXAMPLE 1

(a) An amount of 62.5 g. of chloroacetaldehyde-ethylene acetal is maintained with 800 ml. of methanol and 585 g. of ammonia for 10 hours in an autoclave at 135–145°. After the excess ammonia has been evaporated off, the mixture is concentrated to ca. 800 ml.; an amount of 200 ml. of 5% potassium hydroxide solution is added, and the mixture further concentrated to 200 ml. It is then saturated with sodium chloride; 200 ml. of 50% potassium hydroxide solution are added, and the mixture is continuously extracted with 500 ml. of ether. After drying and concentration by evaporation of the ether extract, aminoacetaldehyde-ethylene acetal is obtained, B.P. 56°–57° at 15 torr.

(b) An amount of 29.6 g. of 2-methylthio-4,6-dichloro-s-triazine is dissolved in 180 ml. of benzene, and to the obtained solution are slowly added dropwise 15.5 g. of aminoacetaldehyde-ethylene acetal at 10–15°. Afterwards are also added dropwise, at the same temperature, 6 g. of sodium hydroxide dissolved in 40 ml. of water. The solution is stirred for four hours at room temperature, filtered and recrystallised from benzene. The obtained 2-methylthio - 4 - chloro-6-[1′,3′-dioxolanyl(2′)-methylamino]-s-triazine has a melting point of 123–124°.

(c) An amount of 6.6 g. of 2-methylthio-4-chloro-6-[1′,3′-dioxalanyl(2′)-methylamino]-s-triazine is dissolved in 100 ml. of toluene, and to the solution are added dropwise at room temperature, with stirring, 4.6 g. of 36.4% aqueous methylamine soluiton. The mixture is refluxed for 20 hours; it is then allowed to cool to room temperature, and the aqueous layer is separated from the organic layer. The toluene phase is washed with water, dried and concentrated by evaporation. The formed 2 - methylthio-4-methylamino - 6 - [1′,3′-dioxalanyl(2′)-methylamino]-s-triazine is recrystallised from benzene and has a melting point of 111°–113°.

EXAMPLE 2

(a) An amount of 7.7 g. of 2,6-dichloro-4-ethylamino-s-triazine is dissolved in 100 ml. of benzene; to the solution are then added dropwise at room temperature, with stirring and cooling, 5.3 g. of aminoacetaldehyde-diethylacetal. To the whole are then added dropwise, likewise at room temperature, 1.6 g. of sodium hydroxide dissolved in 30 ml. of water. The mixture is further stirred at room temperature until a neutral reaction is obtained. The precipitate is filtered off, dried, and recrystallised from acetone. From the filtrate can be further isolated a small amount of 2 - chloro-4-ethylamino-6-($\beta,\beta$-diethoxyethylamino)-s-triazine, M.P. 160°–161°.

(b) 58 g. of 2-chloro-4-ethylamino-6-($\beta,\beta$-diethoxyethylamino)-s-triazine are suspended in 200 ml. of acetone/water 1:1. At room temperature are then added, with stirring and cooling, 20.3 g. of trimethylamine in the form of a 40% aqueous solution, and stirring is carried out at room temperature until everything has gone into solution. An amount of 9.6 g. of methyl mercaptan is then introduced and stirring continued until a fine-crystalline precipitate is formed. The obtained 2-methylthio-4-ethylamino-6-($\beta,\beta$-diethoxy-ethylamino)-s-triazine is filtered off and recrystallised from ether/petroleum ether, M.P. 50°–51°.

EXAMPLE 3

An amount of 193.4 g. of 2,6-dichloro-4-ethylamino-s-triazine is suspended in a mixture of one litre of acetone and one litre of water, and at room temperature are then added, with stirring, 105 g. of aminoacetaldehydedimethylacetal. At the same temperature are further added, dropwise, 200 ml. of 5N sodium hydroxide solution, and stirring is continued until the mixture shows a neutral reaction. To the mixture are then added 56.5 g. of trimethylamine in the form of a 40% aqueous solution, and stirring proceeds until everything has gone into solution. An amount of 48 g. of methyl mercaptan is then added and stirring continued at room temperature. The formed 2-methylthio - 4-ethylamino-6-($\beta,\beta$-dimethoxy-ethylamino)-s-triazine is filtered off after 24 hours and recrystallised from ether-petroleum ether; the M.P. is 66°–67°.

EXAMPLE 4

An amount of 184.4 g. of cyanuric chloride is dissolved in 1000 ml. of toluene, and the solution cooled to −5°; to it are then added, with stirring, 105 g. of aminoacetaldehyde dimethylacetal, whereby the temperature must not exceed 0°. At the same temperature are then added 40 g. of sodium hydroxide dissolved in 160 ml. of water, and stirring is continued until a test shows a neutral reaction. An amount of 48 g. of methyl mercaptan is now introduced at 0°–5°, and 40 g. of sodium hydroxide dissolved in 160 ml. of water are added dropwise; the mixture is stirred at 0°–5° until a neutral reaction is indicated. At room temperature are afterwards added 45.1 g. of ethylamine in the form of a 52% aqueous solution, and thereupon a solution of 40 g. of sodium hydroxide in 160 ml. of water. The mixture is refluxed until it shows a neutral reaction; it is then allowed to cool and the aqueous phase is separated from the organic. The aqueous phase is washed with 100 ml. of toluene; the combined toluene phases are dried, concentrated by evaporation, washed with ether, and dried. In this manner is obtained 2-methylthio-4-ethylamino - 6 - ($\beta,\beta$ - dimethoxy-ethylamino)-s-triazine, M.P. 66°–67°.

EXAMPLE 5

An amount of 4.8 g. of methyl mercaptan is added, at 20°, to a solution of 4 g. of sodium hydroxide in 100 ml. of ethanol. To this solution is added, at room temperature, a solution of 28.9 g. of 2-chloro-4-tert-butylamino-6-($\beta,\beta$-dimethoxy-ethylamino)-s-triazine (obtained according to the process described in Example 2(a) in 150 ml. of toluene; the mixture is refluxed, with stirring, until a neutral reaction is obtained. At 20° are added 500 ml. of water; the two phases are separated from each other, and the aqueous phase is extracted with 100 ml. of toluene. The two toluene solutions are combined, dried, and concentrated by evaporation. The formed 2-methylthio-4-tert-butylamino - 6 - ($\beta,\beta$-dimethoxy-ethylamino)-s-triazine is recrystallised from hexane and has an M.P. of 72–74°.

| Compound: | Melting point, deg. |
|---|---|
| 2-methylthio-4-cyclopropylamino-6-(β,β-diethoxy-ethylamino)-s-triazine | 60–63 |
| 2-methylthio-4-isopropylamino-6-(β,β-diethoxyethylamino)-s-triazine | 83–84 |
| 2-methylthio-4-tert-butylamino-6-(β,β-diethoxyethylamino)-s-triazine | 94–95 |
| 2-methylthio-4-methylamino-6-(β,β-diethoxyethylamino)-s-triazine | 71–74 |
| 2-ethylthio-4-methylamino-6-(β,β-diethoxyethylamino)-s-triazine | 52–54 |
| 2-ethylthio-4-ethylamino-6-(β,β-diethoxy-ethylamino)-s-triazine | 56–58 |
| 2-ethylthio-4-isopropylamino-6-(β,β-diethoxyethylamino)-s-triazine | 65–67 |
| 2-ethylthio-4-tert-butylamino-6-(β,β-diethoxyethylamino)-s-triazine | 91–93 |
| 2-ethylthio-4-cyclopropylamino-6-(β,β-diethoxyethylamino)-s-triazine | 47–50 |
| 2-methylthio-4-isobutylamino-6-(β,β-diethoxyethylamino)-s-triazine | 38–41 |
| 2-methylthio-4-isopropylamino-6-(β,β-dimethoxy-ethylamino)-s-triazine | 81–83 |
| 2-methylthio-4-methylamino-6-(β,β-dimethoxy-ethylamino)-s-triazine | 74–76 |
| 2-ethylthio-4-methylamino-6-(β,β-dimethoxyethylamino)-s-triazine | 51–53 |
| 2-methylthio-4-cyclopropylamino-6-(β,β-dimethoxy-ethylamino)-s-triazine | 75–77 |
| 2-ethylthio-4-isopropylamino-6-(β,β-dimethoxyethylamino)-s-triazine | 54–55 |
| 2-ethylthio-4-tert-butylamino-6-(β,β-dimethoxyethylamino)-s-triazine | 75–77 |
| 2-ethylthio-4-cyclopropylamino-6-(β,β-dimethoxy-ethylamino)-s-triazine | 90–91 |
| 2-methoxylthio-4-cyclobutylamino-6-(β,β-dimethoxy-ethylamino)-s-triazine | 74–76 |
| 2-methylthio-4-cyclopentylamino-6-(β,β-dimethoxy-ethylamino)-s-triazine | 99–101 |
| 2-methylthio-4-cyclopropylamino-6-(β,β-di-n-butoxy-ethylamino)-s-triazine | ——— |
| 2-methylthio-4-ethylamino-6-(β,β-di-n-butoxy-ethylamino)-s-triazine | ——— |
| 2-methylthio-4-methylamino-6-(β,β-di-n-butoxy-ethylamino)-s-triazine | ——— |
| 2-methylthio-4-(α-cyano-α-methyl-ethylamino)-6-(β,β-dimethoxy-ethylamino)-s-triazine | 115–117 |
| 2-methylthio-4-(α-cyano-α-methyl-ethylamino)-6-(β,β-diethoxy-ethylamino)-s-triazine | 107–109 |
| 2-methylthio-4-ethylamino-6-[1',3'-dioxolanyl-(2')-methylamino]-s-triazine | 96–97 |
| 2-methylthio-4-isopropylamino-6-[1',3'-dioxolanyl(2')-methylamino]-s-triazine | 100–101 |
| 2-methylthio-4-tert-butylamino-6-[1',3'-dioxolanyl(2')-methylamino]-s-triazine | 91–93 |
| 2-methylthio-4-cyclopropylamino-6-[1',3'-dioxolanyl(2')-methylamino]-s-triazine | 119–120 |
| 2-methylthio-4-isobutylamino-6-[1',3'-dioxolanyl(2')-methylamino]-s-triazine | 99–100 |
| 2-methylthio-4,6-bis(β,β-dimethoxy-ethylamino)-s-triazine | 97–98 |
| 2-methylthio-4,6-bis-(β,β-diethoxy-ethylamino)-s-triazine | 67–68 |
| 2-methylthio-4-cyclobutylamino-6-(β,β-dimethoxy-ethylamino)-s-triazine | 74–76 |

The new alkylthio-diamino-s-triazines of formula I possess excellent herbicidal properties and are particularly suitable for the control of gramineous and broad-leaved weeds in various cultivated plantations. Applied in high concentrations, the new compounds act as total herbicides; in low concentrations, on the other hand, they act as selective herbicides. Annual and perennial types of weeds which are deep-rooted and difficult to control are destroyed or damaged in growth with a high degree of success by the active substances of formula I. Application of the new active substances can be effected with the same high degree of success before emergence (pre-emergence) and after emergence (post emergence). Field weeds such as, e.g. millet varieties (Panicum sp.), mustard varieties (Sinapis sp.), goosefoot variets (Chenepodiaceae), slender foxtail (Alopecurus sp.) and other pig weed varieties, e.g. Amarantus sp., grasses, e.g. Lolium sp., compositae, e.g. Taraxacum sp., wild chamomile varieties (Matricaria sp.), are thus destroyed or inhibited in growth without damage being done to useful plants, such as grain, maize, cotton, sorghum, soya beans, etc. Furthermore, difficultly controllable varieties of weeds in rice plantations are controled by these active substances, e.g. in wet rice plantations: Echinochloa sp., Elocharis sp., Panicum sp., Cyperaceen, Paspalum sp., etc.; dry rice plantations likewise Echinochloa sp., Digitaria sp., Brachiaria sp., Sida sp., Cyperaceen, Acanthosperum sp., etc. Since in the usual application concentrations the active substances are not toxic for warm-blooded animals, fishes and animals feeding on fish, and only gradually destroy the plants, thus not impairing the oxygen balance and the biological equilibrium, they are very suitable for use in wet rice cultivations. Moreover, the active substances have a wide sphere of action with respect to diverse water weeds, e.g. emersed plants, water plants with and without floating leaves, submerged plants, algae, etc.

The wide sphere of action of the new alkylthiodiamino-s-triazines of formula I renders possible their use for the important control of weeds and wild grasses on the areas surrounding the rice cultivations, such as ditches, canal beds, dams, etc. Not only the mentioned wild grasses occurring in rice cultivations are destroyed but also other gramineous and broad-leaved weeds. The active substances can be used, in the preparation of rice beds, after germination of the plants, also for the destruction of an already germinated crop. Both rice cultivated in water and rice cultivated dry suffers no damage as a result of the application of the new active substances in the usual amounts, and in high concentrations the damage is to a great extent reversible. The applied amounts vary and are dependent on the time of application; they are between 0.1 and 10 kg. of active substance per hectare; in the case of application before emergence of the plants, the amount is up to 1 kg. of active substance per hectare, and after emergences of the plants it is 3 to 10 kg. of active substance per hectare; for a total destruction, however, of the whole weed crop, e.g. on the fallow land adjacent to the cultivated land, it is necessary to use more than 10 kg. of active substance per hectare. The crop rotation so important for the cultivation of rice can, on application of the new active substances, be effected without impairment.

The herbicidal action of the active substances according to the invention was determined by means of the following tests:

1. Herbicidal action with application of the active substances before emergence of the plants (preemergence application)

(a) The active substances are mixed together with seed-bed soil in a concentration of 100 mg. of active substance per litre of soil. Into this soil are planted the following test plants (seed trays):

*Avena sativa*
*Lolium multiflorum*
*Setaria italica*
*Sinapis alba*
*Solanium lycopersianum*

The seed trays are afterwards kept in a greenhouse at 22–25° with 50–70% relative humidity. The results of the test are assessed after 20 days. The evaluation is on the basis of the following scale:

1=plants dead
2–4=intermediate stages of damage (over 50%)

5=50% damage
6-8=intermediate stages of lesser damage (below 50%)
9=plants undamaged (control).

Sorghum (*Sorghum hybridum*)
Soya beans (*Glycine hyspida*)

The respective amounts applied in this test are shown in the following table.

TABLE TO (1a)

| Active substance | Solanum lycopersianum | Setaria italica | Avena sativna | Lolium multiflorum | Sinapis alba |
|---|---|---|---|---|---|
| 2-methylthio-4-ethylamino-6-(β,β-diethoxy-ethylamino)-s-triazine | | 1 | 1 | 1 | 1 |
| 2-methylthio-4-cyclopropylamino-6-(β,β-diethoxy-ethylamino)-s-triazine | 1 | 1 | 1 | 1 | 1 |
| 2-methylthio-4-isopropylamino-6-(β,β-diethoxy-ethylamino)-s-triazine | 1 | 1 | 2 | 1 | 1 |
| 2-methylthio-4-tert-butylamino-6-(β,β-diethoxy-ethylamino)-s-triazine | 1 | 1 | | 5 | 1 |
| 2-methylthio-4-methylamino-6-(β,β-diethoxy-ethylamino)-s-triazine | 1 | 1 | 1 | 1 | 1 |
| 2-ethylthio-4-methylamino-6-(β,β-diethoxy-ethylamino)-s-triazine | 1 | 1 | 3 | 1 | 1 |
| 2-ethylthio-4-ethylamino-6-(β,β-diethoxy-ethylamino)-s-triazine | 1 | 1 | 3 | 1 | 1 |
| 2-ethylthio-4-isopropylamino-6-(β,β-diethoxy-ethylamino)-s-triazine | 1 | 1 | 1 | 1 | 1 |
| 2-ethylthio-4-cyclopropylamino-6-(β,β-diethoxy-ethylamino)-s-triazine | 1 | 1 | 1 | 1 | 1 |
| 2-ethylthio-4-isobutylamino-6-(β,β-diethoxy-ethylamino)-s-triazine | 1 | 1 | 1 | 1 | 1 |
| 2-methylthio-4-ethylamino-6-(β,β-dimethoxy-ethylamino)-s-triazine | 1 | 1 | 1 | 1 | 1 |
| 2-methylthio-4-isopropylamino-6-(β,β-dimethoxy-ethylamino)-s-triazine | 1 | 1 | 1 | 1 | 1 |
| 2-methylthio-4-tert-butylamino-6-(β,β-dimethoxy-ethylamino)-s-triazine | 1 | 1 | 6 | 1 | 1 |
| 2-methylthio-4-methylamino-6-(β,β-dimethoxy-ethylamino)-s-triazine | 1 | 1 | 1 | 1 | 1 |
| 2-ethylthio-4-methylamino-6-(β,β-dimethoxy-ethylamino)-s-triazine | 1 | 1 | 1 | 1 | 1 |
| 2-methylthio-4-cyclopropylamino-6-(β,β-dimethoxy-ethylamino)-s-triazine | 1 | 1 | 1 | 1 | 1 |
| 2-ethylthio-4-isopropylamino-6-(β,β-dimethoxy-ethylamino)-s-triazine | 1 | 1 | 1 | 1 | 1 |
| 2-ethylthio-4-tert-butylamino-6-(β,β-dimethoxy-ethylamino)-s-triazine | 1 | 2 | | 4 | 1 |
| 2-ethylthio-4-cyclopropylamino-6-(β,β-dimethoxy-ethylamino)-s-triazine | 1 | 1 | 1 | 1 | 1 |
| 2-methylthio-4-cyclobutylamino-6-(β,β-dimethoxy-ethylamino)-s-triazine | 1 | 1 | 1 | 1 | 1 |
| 2-methylthio-4-cyclopentylamino-6-(β,β-dimethoxy-ethylamino)-s-triazine | 1 | 1 | 1 | 1 | 1 |
| 2-methylthio-4-(α-cyano-α-methyl-ethylamino)-6-(β,β-dimethoxy-ethylamino)-s-triazine | 1 | 1 | 2 | 1 | 1 |
| 2-methylthio-4-(α-cyano-α-methyl-ethylamino)-6-(β,β-diethoxy-ethylamino)-s-triazine | 1 | 1 | 1 | 1 | 1 |
| 2-methylthio-4,6-bis-(β,β-dimethoxy-ethylamino)-s-triazine | 1 | 1 | 2 | 1 | 1 |
| 2-methylthio-4,6-bis-(β,β-diethoxy-ethylamino)-s-triazine | 1 | 1 | 3 | 2 | 1 |
| 2-methylthio-4-ethylamino-6-[1',3'-dioxolanyl(2')-methylamino]-s-triazine | 1 | 1 | 1 | 1 | 1 |
| 2-methylthio-4-isopropylamino-6-[1',3'-dioxolanyl(2')-methylamino]-s-triazine | 1 | 1 | 1 | 1 | 1 |
| 2-methylthio-4-tert-butylamino-6-[1',3'-dioxolanyl(2')-methylamino]-s-triazine | 1 | 1 | 4 | 1 | 1 |
| 2-methylthio-4-cyclopropylamino-6-[1',3'-dioxolanyl(2')-methylamino]-s-triazine | 1 | 1 | 1 | 1 | 1 |
| 2-methylthio-4-isobutylamino-6-[1',3'-dioxolanyl(2')-methylamino]-s-triazine | 1 | 1 | 1 | 1 | 1 |
| 2-methylthio-4-methylamino-6-[1',3'-dioxolanyl(2')-methylamino]-s-triazine | 1 | 1 | 1 | 1 | 1 |

(b) Immediately after sowing of the test plants, the active substances are applied as an aqueous suspension, obtained from a 25% wettable powder, to the surface of the soil. The seed trays are then kept at 22–23° with 50–70% relative humidity. The results of the test are assessed after 28 days.

The evaluation is on the basis of a scale of 9 values:

9=plants undamaged (control)
1=plants dead
8-2=intermediate stages of damage

TABLE TO 1(b)

| Active substance | Amount applied in kg./hectare | Lolium multiflorum | Poa trivialis | Alopecurus myosuorides | Setaria Italica | Echinochloa crus galli | Amaratus docendens | Chrysanthemum segetum | Sinapis alba | Ipomea purpurea |
|---|---|---|---|---|---|---|---|---|---|---|
| 2-Methylthio-4-isopropylamino-6-[1',3'-dioxolanyl(2')-methylamino]-s-triazine | 4 | 2 | 1 | 2 | 1 | 1 | 1 | 2 | 1 | 1 |
| | 2 | 2 | 1 | 2 | 2 | 2 | 1 | 3 | 1 | 1 |
| | 1 | 6 | 2 | 2 | 3 | 4 | 1 | | 1 | 5 |
| 2-methylthio-4-(α-cyano-α-methyl-ethylamino)-6-(β,β-dimethoxy-ethylamino)-s-triazine | 4 | 1 | 1 | 1 | 1 | 1 | 1 | 1 | 1 | 1 |
| | 2 | 2 | 1 | 1 | 2 | 1 | 1 | 1 | 1 | 1 |
| | 1 | 2 | 1 | 3 | 7 | 3 | 1 | 2 | 1 | 1 |
| 2-methylthio-4-tert-butylamino-6-[1',3'-dioxolanyl(2')-methylamino]-s-triazine | 4 | 2 | 1 | 2 | 2 | 1 | | | | |
| | 2 | 3 | 3 | 3 | 3 | 2 | | | | |
| | 1 | 4 | 3 | 5 | 3 | 2 | | | | |
| 2-methylthio-4-cyclopentylamino-6-(β,β-dimethoxyethylamino)-s-triazine | 4 | 1 | 1 | 2 | 3 | 1 | | | | |
| | 2 | 2 | 1 | 2 | 6 | 2 | | | | |
| | 1 | 7 | 2 | 3 | 6 | 4 | | | | |

The following were used as test plants:

Weeds:
Alopecurus myosuorides
Amarantus docendens
Ipomea purpurea
Lolium multiflorum
Poa trivalis
Setaria italica
Sinapis alba
Chrysanthemum segetum
Echinochloa crusgalli Cultivated plants:
Oats (*Avena sativa*)
Wheat (*Triticum vulgare*)

TABLE TO 1(b)

| Active substance | Amount applied in kg./hectare | Oats | Wheat |
|---|---|---|---|
| 2-methylthio-4-tert-butylamino-6-[1',3'-dioxolanyl(2')-methylamino]-s-triazine | 4 | 9 | 9 |
| | 2 | 9 | 9 |
| | 1 | 9 | 9 |
| 2-methylthio-4-(α-cyano-α-methyl-ethylamino)-6-(β,β-dimethoxy-ethylamino)-s-triazine | 4 | 8 | 7 |
| | 2 | 9 | 8 |
| | 1 | 9 | 8 |
| 2-methylthio-4-cyclopentylamino-6-(β,β-dimethoxy-ethylamino)-s-triazine | 4 | 8 | 7 |
| | 2 | 8 | 8 |
| | 1 | 9 | 9 |
| 2-methylthio-4-ethylamino-6-isopropylamino-s-triazine, known from the U.S. Pat. 2,909,420 | 4 | 1 | 2 |
| | 2 | 1 | 2 |
| | 1 | 5 | 6 |

TABLE TO 1(b)—Continued

| Active substance | Cultivated plants | Amount applied in kg./hectare | | |
|---|---|---|---|---|
| | | 1 | 2 | 4 |
| 2-methylthio-4-isopropylamino-6-[1',3'-dioxolanyl(2')-methylamino]-s-triazine. | Sorghum | 9 | 9 | 7 |
| 2-methylthio-4-tert-butylamino-6-[1',3'-dioxolanyl(2')-methylamino]-s-triazine. | Soya bean | 9 | 9 | 9 |
| Do | Sorghum | 9 | 9 | 9 |
| 2-methylthio-4,6-bis-(isopropylamino)-s-triazine (known from the U.S. Pat. 2,909,420). | Soya bean | 1 | 1 | 1 |
| Do | Sorghum | 1 | 1 | 1 |

2. Herbicidal action with application of the active substances after emergence of the plants (post emergence application)

(a) *Avena sativa, Sinapis alba* and *Papaver rhoeas* are sprayed, in the 4- to 6-leaf stage, with an aqueous active substance emulsion (obtained from a 25% emulsifiable concentrate) in a concentration of 0.5 g. of active substance per square metre of soil (=5.0 kg. per hectare). The plants are then held at 25°–28° with 40–50% relative humidity. The test results are assessed 14 days after the treatment. The evaluation of the results is on the basis of the following scale of 9 values:

9=plants undamaged (control)
1=plants dead
8–2=intermediate stages of damage.

Composition of the emulsifiable concentrate: 25 parts of active substance, 5 parts of a mixture of nonylphenol-polyoxyethylene and calcium-dodecylbenzenesulphonate and 70 parts of xylene.

TABLE TO 2(a)

| Active substance | Avena sativa | Sinapis alba | Papaver rhoeas |
|---|---|---|---|
| 2-methylthio-4-tert-butylamino-6-(β,β-diethoxy-ethylamino)-s-triazine | 8 | 1 | |
| 2-ethylthio-4-tert-butylamino-6-(β,β-dimethoxy-ethylamino)-s-triazine | 8 | 2 | 1 |
| 2-methylthio-4-(α-cyano-α-methyl-ethylamino)-6-(β,β-dimethoxy-ethylamino)-s-triazine | 8 | 1 | 1 |
| 2-methylthio-4-(α-cyano-α-methyl-ethylamino)-6-(β,β-diethoxy-ethylamino)-s-triazine | 8 | 2 | 1 |
| 2-methylthio-4-isopropylamino-6-[1',3'-dioxolanyl(2')-methylamino]-s-triazine | 7 | 2 | 1 |
| 2-methylthio-4-tert-butylamino-6-[1',3'-dioxolanyl(2')-methylamino]-s-triazine | 7 | 2 | 1 |
| 2-methylthio-4-cyclopropylamino-6-[1',3'-dioxolanyl(2')-methylamino]-s-triazine | 6 | 3 | 1 |
| 2-methylthio-4-isobutylamino-6-[1',3'-dioxolanyl(2')-methylamino]-s-triazine | 8 | 2 | 1 |
| 2-methylthio-4-cyclopentylamino-6-(β,β-dimethoxy-ethylamino)-s-triazine | 8 | 4 | 1 |
| 2-methylthio-4-methylamino-6-[1',3'-dioxolanyl(2')-methylamino]-s-triazine | 7 | 2 | 1 |

(b) The following test plans are sown in seed trays:

*Setaria italica*
*Galium aparine*
*Amarantus docendens*
*Papaver rhoeas*
*Taraxacum officinale*
*Sinapis alba*
*Vicia sativa*
Wheat (*Triticum vulgare*)

The plants are treated in the 4-leaf stage with a 2% aqueous active substance emulsion (obtained from a 25% emulsifiable concentrate of the composition given under 2(a), and then maintained at 25°–28° with 40–50% relative humidity in daylight. The test results are assessed after 18 days; the evaluation of the results is on the basis of the 9-value scale. The amounts applied are given in the table.

TABLE TO 2(b)

| Active substance | Amount applied in kg./hectare | Setaria italica | Galium aparine | Amarantus docendens | Papaver rhoeas | Taraxacum officinale | Sinapis alba | Vicia sativa | Wheat |
|---|---|---|---|---|---|---|---|---|---|
| 2-methylthio-4-ethylamino-6-(β,β-diethoxy-ethylamino)-s-triazine | 2.5 | 1 | 2 | 1 | 1 | 2 | 1 | 1 | 9 |
| | 1.2 | 1 | 2 | 1 | 1 | 2 | 1 | 1 | 9 |
| | 0.6 | 2 | 4 | 1 | 1 | 7 | 1 | 1 | 9 |

3. Herbicidal action in the case of preemergence-application of the active substances in rice with sown weeds (a) Dry test: Pots are filled with garden soil; rice (*Oryza oryzoides*) is then sown as the test plant, and *Echinochloa crus galli* as the weed. The active substance is prepared as a 25% wettable powder; this is applied in the form of an aqueous dispersion to the surface of the soil immediately after sowing (amount of liquor: 100 ml. per square metre).

(b) Wet test: The aqueous dispersion of the active substance is applied to the surface of the soil in the test containers, and worked into a depth of ca. 1 cm. The test plants, rice and *Echinochloa crus galli*, are thereupon sown, and the soil is completely saturated with water. After emergence of the seed, the water level in the containers is raised to ca. 2–3 cm. above the surface of the soil.

Both tests are carried out in a greenhouse at 24°–27° with 70% relative humidity. The assessment of the test results is made after 28 days, the evaluation being based on the following scale of 9 values:

9=plants undamaged (control),
1=plants dead,
8–2=intermediate stages of damage

TABLE TO 3(a)

| Active substance | Amount applied in kg./hectare | Rice | Echinochloa crus galli |
|---|---|---|---|
| 2-methylthio-4-isopropylamino-6-[1',3'-dioxolanyl(2')-methylamino]-s-triazine. | 2 | 8 | 2 |
| | 1 | 9 | 4 |
| 2-methylthio-4-tert-butylamino-6-[1',3'-dioxolanyl(2')-methylamino]-s-triazine. | 1 | 9 | 2 |
| | 0.5 | 9 | 2 |
| 2-methylthio-4-cyclopentylamino-6-(β,β-dimethoxy-ethylamino)-s-triazine. | 2 | 9 | 2 |
| | 1 | 9 | 4 |
| 2-methylthio-4-(α-cyano-α-methyl-ethylamino)-6-(β,β-dimethoxy-ethylamino)-s-triazine. | 2 | 7 | 1 |
| | 1 | 8 | 3 |
| 2-methylthio-4-ethylamino-6-isopropylamino-s-triazine (known from the U.S. Pat. 2,909,420). | 2 | 2 | 1 |
| | 1 | 3 | 1 |
| 2-methylthio-4-ethyl-6-(β,β-dimethoxy-ethylamino)-s-triazine. | 1 | 8 | 2 |
| | 0.5 | 9 | 3 |
| 2-methylthio-4-tert-butylamino-6-[1',3'-dioxolanyl(2')-methylamino]-s-triazine. | 1 | 9 | |
| | 0.5 | 9 | |
| 2-methylthio-4-cyclopentylamino-6-(β,β-dimethoxy-ethylamino)-s-triazine. | 2 | 8 | 1 |
| | 1 | 9 | 3 |
| 2-methylthio-4,6-bis-ethylamino-s-triazine (known from the U.S. Pat. 2,909,420). | 2 | 1 | 1 |
| | 1 | 2 | 1 |

Herbicidal agents according to the invention are produced in a manner known per se by the intimate mixing and grinding of active substances of the general formula I with suitable carriers, optionally with the addition of dispersing agents or solvents which are inert to the active substances. The active substances can be obtained and used in the following forms:

solid preparations: dusts, scattering agents, granulates, (coated granulates, impregnated granulates and homogeneous granulates);
water-dispersible concentrates of the active substance: wettable powders, pastes, emulsions;
liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground limestone, Atta-clay, dolomite, diatomaceous earth, precipitated silicic acid, alkaline-earth silicates, sodium and potassium aluminium silicates (feldspar and mica), calcium and magnesium sulphates, magnesium oxide, ground synthetic materials, fertilisers such as ammonium sulphate, ammonium phosphates, ammonium nitrate, urea, ground vegetable products such as bran, bark dust, sawdust, ground nutshells, cellulose powder, residues of plant extractions, active charcoal, etc., alone or in admixture with each other. The particle size of the carriers is for dusts advantageously up to about 0.1 mm.; for scattering agents from about 0.075 mm. to 0.2 mm.; and for granulates 0.2 mm. or coarser.

The concentrations of active substance in the solid preparation forms are from 0.5 to 80%.

To these mixtures may also be added additives stabilising the active substance, and/or non-ionic, anion-active, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, ligninsulphonic acids, their alkali metal and alkaline-earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80%.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali-metal and alkaline-earth metal salts.

Suitable anti-foam agents are, for example, silicones.

The active substances are so mixed, ground, sieved and strained with the above mentioned additives that the solid constituent in the case of wettable powders has a particle size not exceeding 0.02 to 0.04 mm., and in the case of pastes not exceeding 0.03 mm. For the preparation of emulsion concentrates and pastes are used dispersing agents such as those mentioned in the preceding paragraphs, organic solvents, and water. Suitable solvents are, e.g. the following: alcohols, benzene, xylenes, toluene, dimethylformamide, dimethylsulphoxide, and mineral oil fractions boiling in the range of 120 to 350°. The solvents must be practically odourless, non-phytotoxic, inert to the active substances, and not readily inflammable.

Furthermore, the agents according to the invention can be used in the form of solutions. For this purpose, the active substance (or several active substances) is (or are) dissolved in suitable organic solvents, mixtures of solvents, or water. As organic solvents it is possible to use aliphatic and aromatic hydrocarbons, their chlorinated derivatives, alkylnaphthalenes, mineral oils on their own or in admixture with each other. The solutions should contain the active substances in a concentration of from 1 to 20%.

To the described agents according to the invention may be added other biocidal active substances or agents. For the widening of their sphere of action, the new agents may also contain, in addition to the stated compounds of the general formula I, e.g. insecticides, fungicides, bactericides, fungistatics, bacteriostatics or nematocides. The agents according to the invention can also contain fertilisers, trace elements, etc.

In the following are described preparations of the new triazines. The term "parts" denotes parts by weight.

Granulate

The following substances are used for the preparation of a 5% granulate:

5 parts of 2-methylthio-4-ethylamino-6-($\beta,\beta$-diethoxy-ethylamino)-s-triazine,
0.25 parts of epichlorohydrin,
0.24 parts of cetyl polyglycol ether,
3.50 parts of polyethylene glycol,
91 parts of kaolin (particle size 0.3 to 0.8 mm.).

The active substance is mixed with epichlorohydrin and the mixture dissolved in 6 parts of acetone; to the solution are thereupon added polyethylene glycol and cetyl polyglycol ether. The thus obtained solution is sprayed on to kaolin, and subsequently evaporated in vacuo.

Wettable powder

The following constituents are used for the preparation of (a) a 50%, (b) a 25%, and (c) a 10% wettable powder:

(a)

50 parts of 2-methylthio-4-isopropylamino-6-[1',3'-dioxolanyl(2')-methylamino]-s-triazine,
5 parts of sodium dibutylnaphthyl sulphonate,
3 parts of naphthalenesulphonic acid/phenolsulphonic acid/formaldehyde condensate 3:2:1,
20 parts of kaolin,
22 parts of Champagne chalk;

(b)

25 parts of 2-methylthio-4-tert-butylamino-6-[1',3'-dioxolanyl(2')-methylamino]-s-triazine,
5 parts of the sodium salt of oleylmethyl tauride,
2.5 parts of naphthalenesulphonic acid/formaldehyde condensate, 0.5 parts of carboxymethyl cellulose,
5 parts of neutral potassium aluminium silicate,
62 parts of kaolin;

(c)

10 parts of 2-methylthio-4-(α-cyano-α-methyl-ethyl-amino)-6-(β,β-dimethoxy-ethylamino)-s-triazine,
3 parts of a mixture of the sodium salts of saturated fatty alcohol sulphates,
5 parts of naphthalenesulphonic acid/formaldehyde condensate,
82 parts of kaolin.

The stated active substance is absorbed onto the corresponding carriers (kaolin and chalk), and the whole subsequently mixed and ground. Wettable powders having excellent wettability and suspension properties are thus obtained. From such wettable powders can be obtained, by dilution with water, suspensions of any desired concentration of active substance. Such suspensions are used for the control of weeds and wild grasses in cultivated plantations.

Paste

The following substances are used for the preparation of a 45% paste:

45 parts of 2-methylthio-4-cyclopenylamino-6-(β,β-dimethoxy-ethylamino)-s-triazine,
5 parts of sodium aluminium silicate,
14 parts of cetyl polyglycol ether having 8 moles of ethylene oxide,
1 part of oleylpolyglycol ether having 5 moles of ethylene oxide,
2 parts of spindle oil,
10 parts of polyethylene glycol,
23 parts of water.

The active substance is intimately mixed and ground, in suitable devices with the additives. A paste is thus obtained from which can be produced, by dilution with water, suspensions of any desired concentration. The suspensions are suitable for the treatment of vegetable plantations.

Emulsion concentrate

The following ingredients are mixed together for the preparation of a 25% emulsion concentrate:

25 parts of 2-methylthio-4-ethylamino-6-(β,β-dimethoxy-ethylamino)-s-triazine,
5 parts of a mixture of nonlyphenolpolyoxyethylene and calcium dodecylbenzenesulphonate,
35 parts of 3,5,5-trimethyl-2-cyclohexen-1-one,
35 parts of dimethylformamide.

This concentrate can be diluted with water to obtain emulsions of suitable concentrations. Such emulsions are suitable for the control of weeds in cultivated plantations such as, e.g. cotton, maize, etc.

We claim:

1. A herbicidal composition comprising (1) as active ingredient a compound of the formula

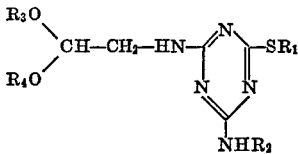

wherein $R_1$ represents methyl or ethyl; $R_2$ represents optionally cyano substituted alkyl having from 1 to 4 carbon atoms or cycloalkyl having from 3 to 5 carbon atoms; each of $R_3$ and $R_4$ represents lower alkyl, or $R_3$ and $R_4$ taken together represent ethylene, and (2) a carrier.

2. A method for controlling mono- and dicotyledonous weeds comprising applying thereto a herbicidally effective amount of a compound of the formula

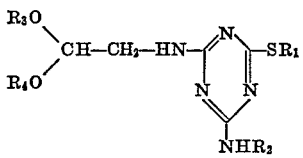

wherein $R_1$ represents methyl or ethyl; $R_2$ represents optionally cyano substituted alkyl having from 1 to 4 carbon atoms or cycloalkyl having from 3 to 5 carbon atoms; each of $R_3$ and $R_4$ represents lower alkyl, or $R_3$ and $R_4$ taken together represent ethylene.

3. A method according to claim 2 in which the compound is 2-methylthio-4-ethylamino-6-(β,β-dimethoxy-ethylamino)-s-triazine.

4. A method according to claim 2 in which the compound is 2-methylthio-4-ethylamino-6-(β,β-diethoxyethyl-amino)-s-triazine.

5. A method according to claim 2 in which the compound is 2-methylthio-4-isopropylamino-6-[1',3'-dioxolanyl(2')-methylamino]-s-triazine.

6. A method according to claim 2 in which the compound is 2-methylthio-4-tert. butylamino-6-[1',3' dioxolanyl(2$_2$)-methylamino]-s-triazine.

7. A method according to claim 2 in which the compound is 2-methylthio-4-cyclopentylamino-6-(β,β-dimethoxy-ethylamino)-s-triazine.

8. A method according to claim 2 in which the compound is 2-methylthio-4-α-cyano-isopropylamino-6-(β,β-dimethoxy-ethylamino)-s-triazine.

References Cited
UNITED STATES PATENTS

| | | | |
|---|---|---|---|
| 3,505,325 | 4/1970 | Schwarze | 260—249.8 |
| 3,326,914 | 6/1967 | Knusli et al. | 260—249.8 |
| 3,326,912 | 6/1967 | Yamamoto et al. | 260—249.8 |

LEWIS GOTTS, Primary Examiner

C. L. MILLS, Assistant Examiner

UNITED STATES PATENT OFFICE
CERTIFICATE OF CORRECTION

Patent No. 3,817,741  Dated June 18, 1974

Inventor(s) Manfred Kuhne and Christian Vogel

It is certified that error appears in the above-identified patent and that said Letters Patent are hereby corrected as shown below:

Column 14, line 42 should read:

anyl(2')-methylamino]-s-triazine.

Signed and sealed this 15th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,817,741     Dated June 18, 1974

Inventor(s) Manfred Kühne and Christian Vogel

It is certified that error appears in the above-identified patent and that said Letters Patent are hereby corrected as shown below:

Insert the following information in the Heading:

Claims priority, application Switzerland, August 20, 1970, No. 12486/70

Signed and sealed this 29th day of April 1975.

(SEAL)
Attest:

RUTH C. MASON
Attesting Officer

C. MARSHALL DANN
Commissioner of Patents
and Trademarks